(12) United States Patent
Nakajima

(10) Patent No.: US 11,755,266 B2
(45) Date of Patent: Sep. 12, 2023

(54) PRINTING DEVICE WITH AN OPTION OF ATTACHMENT AND DETACHMENT OF OPTIONAL HARDWARE TO A CONNECTOR AND NOTIFYING A MANAGEMENT DEVICE TO ACQUIRE PERMISSION FOR USING FUNCTION OF ATTACHED OPTIONAL HARDWARE, MANAGEMENT SYSTEM, AND MANAGEMENT METHOD

(71) Applicant: SEIKO EPSON CORPORATION, Tokyo (JP)

(72) Inventor: Norihiko Nakajima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/663,841

(22) Filed: May 18, 2022

(65) Prior Publication Data
US 2022/0374180 A1  Nov. 24, 2022

(30) Foreign Application Priority Data

May 20, 2021  (JP) .................................. 2021-085261

(51) Int. Cl.
  *G06F 3/12* (2006.01)
  *G03G 21/16* (2006.01)
(52) U.S. Cl.
  CPC .......... *G06F 3/1238* (2013.01); *G06F 3/1222* (2013.01); *G06F 3/1229* (2013.01); *G03G 21/16* (2013.01)

(58) Field of Classification Search
  None
  See application file for complete search history.

(56) References Cited

U.S. PATENT DOCUMENTS

| 10,613,801 B1 * | 4/2020 | Matysiak | G06F 3/1273 |
| 2016/0092146 A1 * | 3/2016 | Adachi | G06F 3/1239 |
| | | | 358/1.14 |
| 2018/0101665 A1 * | 4/2018 | Ogura | G06F 3/0486 |
| 2020/0201228 A1 * | 6/2020 | Kawaguchi | G06F 3/1219 |
| 2020/0364004 A1 * | 11/2020 | Omura | G06F 3/1235 |

FOREIGN PATENT DOCUMENTS

| JP | 2013197731 A | * | 9/2013 |
| JP | 2018-061259 A | | 4/2018 |

OTHER PUBLICATIONS

Machine Translation in English of JP Pub 2013-197731A to Gen Sonto.*

* cited by examiner

*Primary Examiner* — Haris Sabah
(74) *Attorney, Agent, or Firm* — Global IP Counselors, LLP

(57) ABSTRACT

A printing device is provided. The printing device includes: an attachment/detachment unit which an option is attachable to and detachable from; a communication unit notifying an external management device of installation of the option, using encrypted communication; and a management unit managing whether a function using the option is available or not, in response to a permission report that the option is available or a no-permission report that the option is unavailable, from the management device.

11 Claims, 8 Drawing Sheets

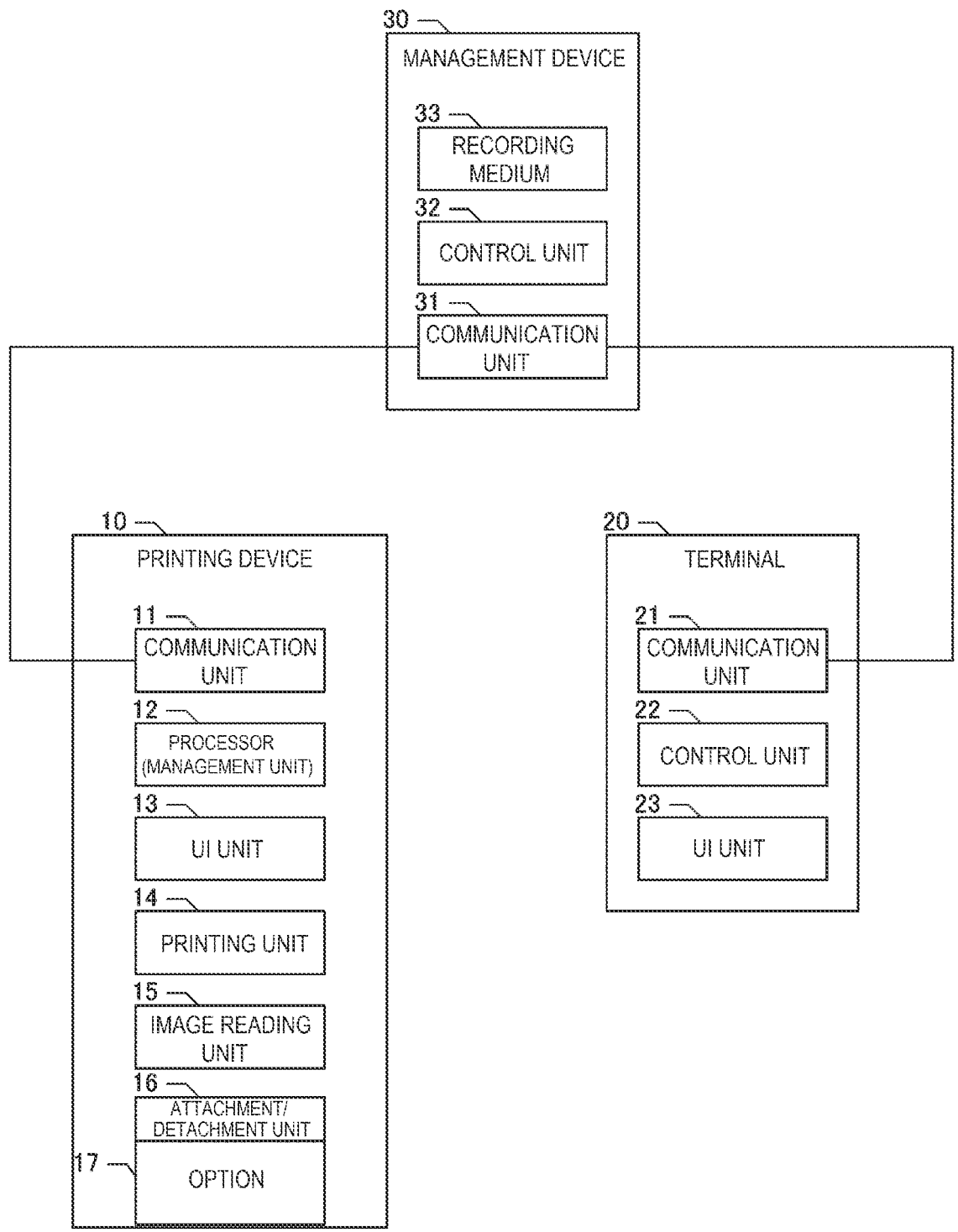

FIG. 2

INDIVIDUAL MANAGEMENT TABLE FOR PRINTING DEVICE

| SERIAL NUMBER OF PRINTING DEVICE | USER ID | SERIAL NUMBER OF INSTALLED HW OPTION |
|---|---|---|
| P001 | USER001 | OP001 |
| P002 | USER002 | INVALID VALUE |

FIG. 3

INDIVIDUAL MANAGEMENT TABLE FOR HW OPTION

| SERIAL NUNMBER OF OPTION | WHETHER SUBSCRIPTION CONTRACT HAS BEEN CONCLUDED OR NOT | USER ID OF USER WHO HAS CONCLUDED SUBSCRIPTION CONTRACT | SUBSCRIPTION PERIOD |
|---|---|---|---|
| OP001 | YES | USER001 | FROM BEGINNING OF mm MONTH, 202X TO END OF MM MONTH, 202Y |
| OP002 | NO | INVALID VALUE | INVALID VALUE |

FIG. 4

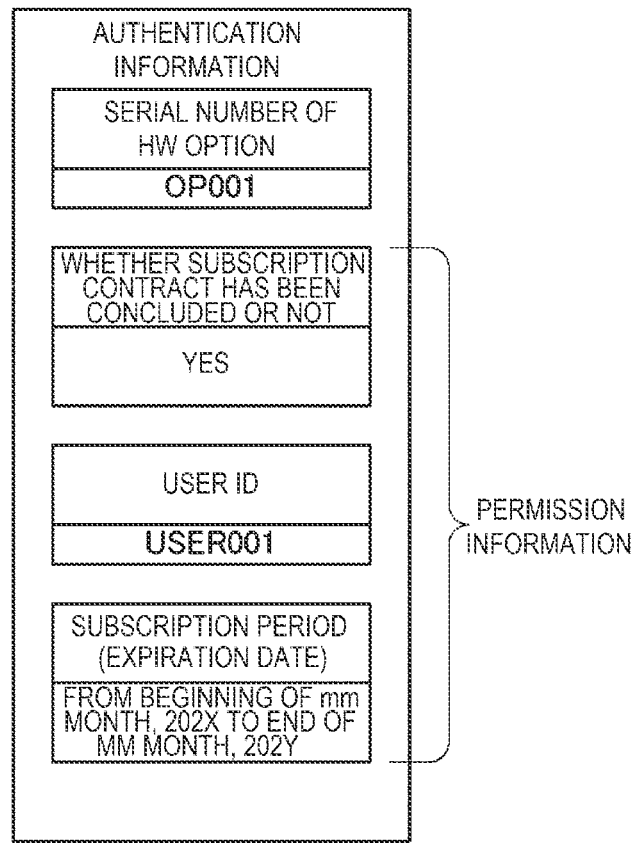

FIG. 5

| RETAINED INFORMATION |
|---|
| SERIAL NUMBER OF PRINTING DEVICE |
| P001 |
| USER ID |
| USER001 |
| PASSWORD |
| ******** |
| SERIAL NUMBER OF INSTALLED HW OPTION |
| OP001 |
| WHETHER SUBSCRIPTION CONTRACT FOR INSTALLED HW OPTION HAS BEEN CONCLUDED OR NOT |
| YES |
| SUBSCRIPTION PERIOD (EXPIRATION DATE) |
| FROM BEGINNING OF mm MONTH, 202X TO END OF MM MONTH, 202Y |

PRINTING DEVICE WITH AN OPTION OF ATTACHMENT AND DETACHMENT OF OPTIONAL HARDWARE TO A CONNECTOR AND NOTIFYING A MANAGEMENT DEVICE TO ACQUIRE PERMISSION FOR USING FUNCTION OF ATTACHED OPTIONAL HARDWARE, MANAGEMENT SYSTEM, AND MANAGEMENT METHOD

The present application is based on, and claims priority from JP Application Serial Number 2021-085261, filed May 20, 2021, the disclosure of which is hereby incorporated by reference herein in its entirety.

BACKGROUND

1. Technical Field

The present disclosure relates to a printing device, a management system, and a management method.

2. Related Art

JP-A-2018-61259 discloses that a server executes an application corresponding to model-specific information of an image forming device and that a terminal such as a tablet designates the application.

The related-art technique does not take into account a method for managing a hardware option that is attachable to and detachable from a device.

SUMMARY

A printing device includes: an attachment/detachment unit which an option is attachable to and detachable from; a communication unit notifying an external management device of installation of the option; and a management unit managing whether a function using the option is available or not, in response to a permission report that the option is available or a no-permission report that the option is unavailable, from the management device.

A management system includes an electronic device and a management device. The electronic device includes: an attachment/detachment unit which an option is attachable to and detachable from; a communication unit notifying the management device of installation of the option in response to the fact that the option is newly installed; and a management unit managing whether a function using the option is available or not, in response to a permission report that the option is available or a no-permission report that the option is unavailable, from the management device. The management device includes a control unit transmitting the permission report or the no-permission report to the electronic device, based on a status of a contract for use of the option, when the management device is notified of the installation of the option from the electronic device.

A management method for an electronic device which an option is attachable to and detachable from is provided. The management method includes: causing a management device to report to the electronic device about whether a function using the installed option is available or not, based on a status of a contract for use of the option; and causing the electronic device to manage whether the function using the option installed in the electronic device is available or not, according to the report from the management device.

BRIEF DESCRIPTION OF THE DRAWINGS

FIG. 1 is a block diagram of a management system.
FIG. 2 shows an example of an individual management table for a printing device recorded in a management device.
FIG. 3 shows an example of an individual management table for an HW option recorded in the management device.
FIG. 4 shows an example of authentication information recorded in the HW option.
FIG. 5 shows an example showing retained information recorded in the printing device.

DESCRIPTION OF EXEMPLARY EMBODIMENTS

Figure 6:
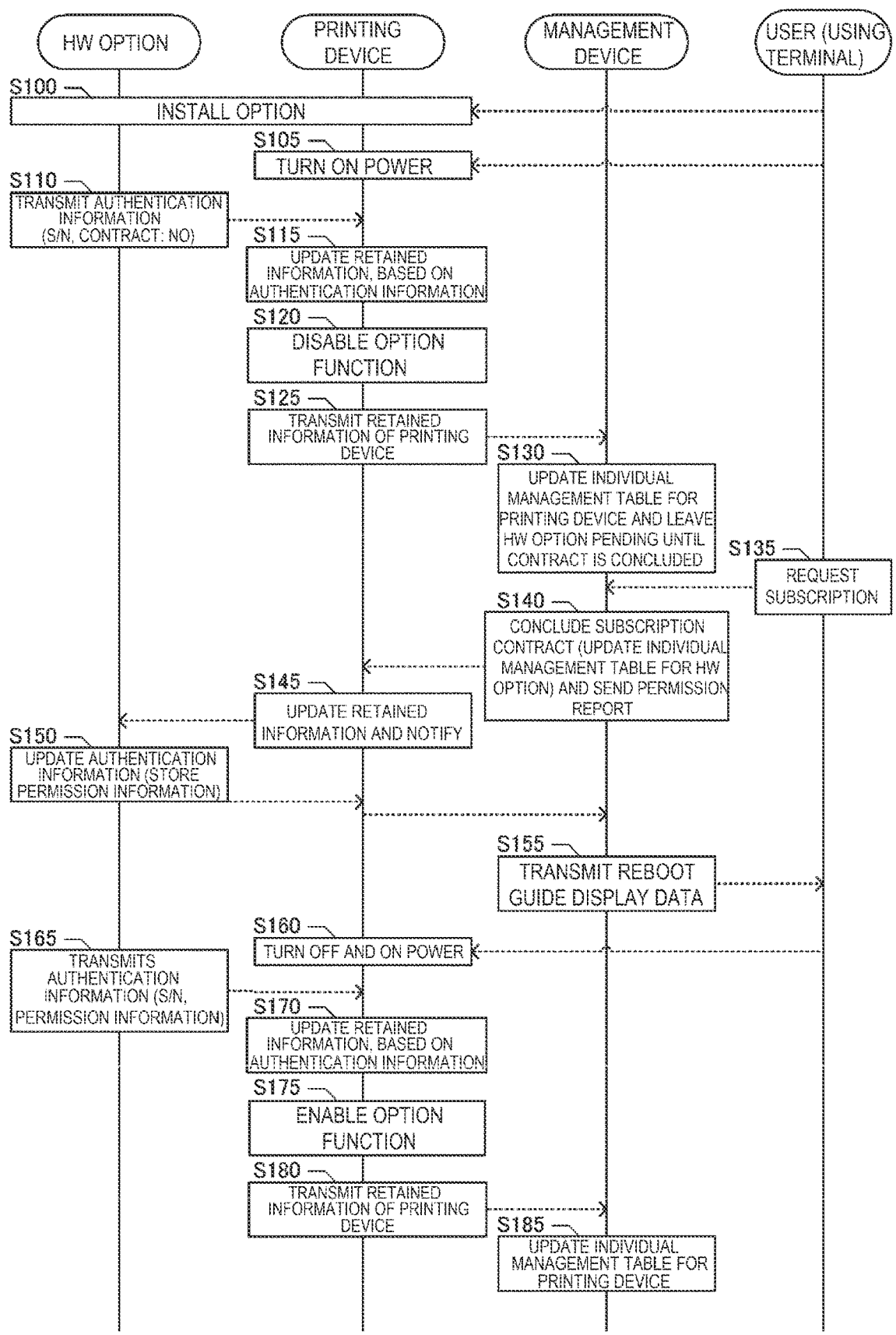
FIG. 6 is a sequence chart showing an example of installation sequence for an uncontracted HW option.

An embodiment of the present disclosure will now be described in the following order.
(1) Configuration of management system
(2) Installation sequence for uncontracted HW option
(3) Contract termination sequence
(4) Installation sequence for contracted HW option
(5) Other embodiments

(1) Configuration of Management System

FIG. 1 is a block diagram showing the configuration of a management system according to an embodiment of the present disclosure. The management system is a system for managing whether an attachable/detachable hardware option (HW option) 17 installed in a printing device 10 is available or not. In this embodiment, the management system includes the printing device 10, a terminal 20, and a management device 30. The HW option 17 that can be added to the printing device 10 may be, for example, a FAX board, an additional LAN board, or a finisher for printed matter (stapler or the like). In this embodiment, the HW option 17 is provided separately from the printing device 10. A user can conclude a subscription contract for each HW option 17 with the provision source and thus can use a function using the HW option 17 during the contract period (subscription period). Various subscription periods such as monthly or yearly subscription can be set.

In the printing device 10 in this embodiment, as opposed to the attachable/detachable HW option 17, a software option (SW option) that enables the use of a function using a mechanism that is not attachable or detachable may be available, based on a subscription contract. The SW option may be, for example, an ADF, color print, copy with red removal or the like. While the mechanism of the ADF itself is not removable, a program implementing the ADF function is provided as an option. Similarly, for the color print and the copy with red removal, programs implementing these functions are provided as options. A management method for the attachable/detachable HW option 17 will now be described.

The terminal 20 is a terminal used by the user of the printing device 10 in order to perform procedures for user registration of the printing device 10 and subscription contract for an option (both HW and SW). The terminal 20 may be, for example, a tablet, a smartphone, a PC or the like. The terminal 20 has a communication unit 21, a control unit 22, and a UI unit 23. The control unit 22 has a CPU, a RAM, a ROM, and a non-volatile memory, and the like, not illustrated, and can cause the CPU to execute various programs recorded in the non-volatile memory and the ROM. The communication unit 21 includes a communication circuit for communicating with an external device. The control unit 22 can communicate with the management device 30 via the communication unit 21. In this embodiment, the UI unit 23 includes a touch panel display. The control unit 22 can cause the UI unit 23 to display various kinds of information and can take in an instruction by the user based on an operation carried out on the UI unit 23.

The management device 30 is a server managing information about the serial number of the main body of the printing device 10, the serial number of the HW option 17, and the subscription contract for the HW option 17. The management device 30 has a communication unit 31, a control unit 32, and a recording medium 33. The communication unit 31 has a communication circuit for communicating with an external device. The control unit 32 has a CPU, a ROM, a RAM or the like, not illustrated, and can execute a program recorded in the ROM and the recording medium 33. The control unit 32 can communicate with the printing device 10 and the terminal 20 via the communication unit 31.

In this embodiment, an individual management table for the printing device 10 shown in FIG. 2 and an individual management table for the HW option 17 shown in FIG. 3 are stored in the recording medium 33 of the management device 30. In the individual management table for the printing device shown in FIG. 2, the serial number of the main body of the printing device 10, the user ID of the user of the printing device 10, and the serial number of the installed HW option 17 are recorded in association with each other, for each individual printing device. The user ID is linked to the corresponding information in the individual management table for the printing device by the user performing user registration at a management site, described later, and registering the serial number of the printing device 10. When the HW option 17 is not installed in the printing device 10, an invalid value is set as the serial number of the installed option. When a plurality of attachment/detachment units 16 are provided in one printing device 10, the serial number of the installed HW option 17 may be managed, based on each of the identifiers of the attachment/detachment units 16.

In the individual management table for the HW option 17 shown in FIG. 3, the serial number, whether a subscription contract has been concluded or not, the user ID of the user who has concluded a subscription contract, and the subscription period are recorded in association with each other, for each individual HW option 17. In the individual management table for the printing device 10 shown in FIG. 2, information about an SW option for which a subscription contract has been concluded in the printing device 10, not illustrated, for example, the type of the SW option and the subscription period or the like, may be additionally stored in association with the corresponding information.

The control unit 32 of the management device 30 discloses a management site as a website for performing procedures for a subscription contract for an option (HW, SW). In the recording medium 33 of the management device 30, a user management table, not illustrated, in which the user ID, the password, the contact information such as the residence address or email address, and information about settlement are associated with each other for each user, is additionally recorded. When inputting the user ID and the password and thus logging in at the management site, the user can browse the information about the printing device used by the user, the information about the HW option installed in this printing device, the contact information of the user, the information about settlement, and the like. After logging in, the user can designate the serial number of the HW option 17 and request the conclusion of a subscription contract for this HW option 17 or request the termination of the contract. In response to such a request, the control unit 32 of the management device 30 concludes or terminates the subscription contract for the HW option 17. The subscription period is decided according to the date when the contract is concluded and the period selected by the user. When the subscription contract is concluded, the control unit 32 updates the information about whether the subscription contract for the HW option having the corresponding serial number has been concluded or not, to "YES", and stores the user ID and the subscription period in association with each other, in the individual management table for the HW option 17 shown in FIG. 3. The control unit 32 then transmits a permission report that the HW option 17 is available, to the printing device 10. The permission report includes the information representing the subscription contract "YES" and the subscription period. When the subscription contract is terminated, the control unit 32 of the management device 30 updates the information about whether the subscription contract has been concluded or not, to "NO", and sets an invalid value as the user ID and the subscription period. The control unit 32 then transmits a no-permission report that the HW option is unavailable, to the printing device 10. The no-permission report includes the information representing the subscription contract "NO".

In this embodiment, as will be described later, the information stored in the HW option 17 is configured to be transmitted to the printing device 10 and also handed over to the management device 30 via the printing device 10, when the HW option 17 is installed in the attachment/detachment unit 16 of the printing device 10. The value of the "serial number of the installed HW option" in the individual management table for the printing device shown in FIG. 2 is updated, based on the information transmitted from the printing device 10 to the management device 30 in response to the attachment or detachment of the HW option 17 to or from the attachment/detachment unit 16 of the printing device 10. That is, when the serial number of the printing device 10 and the serial number of the installed HW option 17 are transmitted from the printing device 10, the control unit 32 of the management device 30 records this number as the serial number of the HW option 17 installed in the corresponding printing device 10. When an invalid value is transmitted from the printing device 10 as the serial number of the HW option 17, the control unit 32 records the invalid value as the serial number of the HW option 17 installed in the corresponding printing device 10 and regards that the HW option 17 is not installed in the corresponding printing device 10.

The printing device 10 has a communication unit 11, a processor 12, a UI unit 13, a printing unit 14, an image reading unit 15, and the attachment/detachment unit 16. That is, in this embodiment, the printing device 10 has an image reading function in addition to a printing function. The processor 12 has a CPU, a ROM, a RAM, a non-volatile memory or the like. The processor 12 causes the CPU to execute various programs recorded in the ROM and the non-volatile memory, using the RAM, and thus can control each part of the printing device 10. The programs include a print control program for controlling the printing unit 14 to execute printing and a reading control program for controlling the image reading unit 15 to execute image reading. The processor 12 in this embodiment can also execute an option management program for managing whether the HW option 17 is available or not, in response to the attachment or detachment of the HW option 17. The processor 12 may be formed by a single chip or a plurality of chips. The processor 12 may also be formed as an SoC with various functional blocks causing the printing device 10 to operate. An ASIC may be employed, for example, instead of the CPU. A configuration in which the CPU and an ASIC cooperate with each other may be employed as well.

The communication unit 11 includes a communication circuit for performing wired or wireless communication with an external device. The printing device 10 can communicate with the management device 30 via the communication unit 11. This communication is encrypted by a common key cryptosystem but may be encrypted by a public key cryptosystem. When security is ensured, the communication may use a plain text. The UI unit 13 is a user interface and includes a touch panel display and various switches such as a power switch. The processor 12 can cause the display of the UI unit 13 to display various kinds of information and thus notify the user. The processor 12 can also acquire an instruction by the user, based on an operation carried out by the user on the touch panel or the like of the UI unit 13.

The printing unit 14 has an actuator, a sensor, a drive circuit, a mechanical component, and the like for executing printing on various print media by a known printing method such as an inkjet method or an electrophotographic method. The image reading unit 15 has, for example, a color image sensor and a light source that are known, an actuator, a drive circuit, and a sensor for feeding a document, a mechanical component, and the like, in order to read a document placed on a document holder glass or a document set in an ADF document tray, not illustrated.

The attachment/detachment unit 16 is a part (referred to as a slot, for example) for installing the HW option 17. The HW option 17 installed in the attachment/detachment unit 16 can be removed from the attachment/detachment unit 16. The HW option 17 is equipped with an ASIC and a non-volatile memory for implementing the functions of the HW option 17. When the HW option 17 is installed in the attachment/detachment unit 16 and the power of the printing device 10 is turned on, the HW option 17 can communicate with the processor 12 of the printing device 10.

In the non-volatile memory of the HW option 17, authentication information shown in FIG. 4 is recorded. In this embodiment, the authentication information includes the serial number of the HW option 17, information representing whether a subscription contract has been concluded or not, the user ID, the subscription period, and the like. The serial number of the HW option 17 itself is a fixed value, that is, information that will not be rewritten. When, as the authentication information, "whether a subscription contract has been concluded or not" is "YES" and the user ID and the subscription period are recorded, these pieces of information are equivalent to "permission information", described later. The permission information is information recorded in response to a permission report from the management device 30 when the HW option 17 is installed in the printing device 10.

When the attachment or detachment of the HW option 17 to and from the attachment/detachment unit 16 is detected or when a notification that the information about the HW option 17 has been updated is received from the management device 30, the processor 12 executes the option management program. In this case, the processor 12 functions as a management unit. By executing the option management program, the processor 12 can manage whether a function using the HW option 17 is available or not, in response to a permission report that the HW option 17 is available or a no-permission report that the HW option 17 is unavailable, from the management device 30.

Specifically, when the HW option 17 is installed, the processor 12 executes the management program and thus can communicate with the ASIC of the HW option 17 and acquire the foregoing authentication information shown in FIG. 4 recorded in the non-volatile memory of the HW option 17. In the non-volatile memory of the HW option 17 for which a subscription contract has not been concluded yet, information representing that the subscription contract for this HW option 17 is "NO" is recorded as the authentication information, where the user ID and the subscription period are invalid values. Therefore, when the HW option 17 for which a subscription contract has not been concluded is installed, the processor 12 can acquire the information representing the subscription contract "NO" from the HW option 17. When the HW option 17 for which a subscription contract has already been concluded is installed, the processor 12 can acquire the information representing the subscription contract "YES", the user ID, and the subscription period from the HW option 17.

In the non-volatile memory of the printing device 10, retained information shown in FIG. 5 is recorded. The retained information includes the serial number of the main body of the printing device 10, the user ID and the password of the user of the printing device 10, the serial number of the HW option 17 installed in the attachment/detachment unit 16, information representing whether a subscription contract for the HW option 17 has been concluded or not, and the subscription period, as shown in FIG. 5. The serial number of the main body of the printing device 10 is a fixed value. The user ID and the password are inputted and held as the retained information in the printing device 10 when the user of the printing device 10 performs user registration for the printing device 10. The printing device 10 has a timekeeping circuit, not illustrated. The processor 12 can acquire the current time from the timekeeping circuit. The information of the current time, too, can be regarded as a type of retained information retained in the printing device 10.

When the HW option 17 is installed, the processor 12 updates the retained information shown in FIG. 5, based on the authentication information shown in FIG. 4 acquired from the HW option 17. That is, the processor 12 records the serial number acquired from the HW option 17 actually installed in the attachment/detachment unit 16, as the "serial number of the installed HW option 17" in the retained information shown in FIG. 5. The processor 12 also updates the information of "whether a subscription contract for the installed HW option 17 has been concluded or not" shown in FIG. 5, with the value of the information of "whether a subscription contract has been concluded or not" acquired from the HW option 17.

When the HW option 17 is removed from the attachment/detachment unit 16, the processor 12 detects that nothing is coupled to the attachment/detachment unit 16. The processor 12 then sets an invalid value as the "serial number of the installed HW option 17" and the subscription period in the retained information and sets "NO" as the information of "whether a subscription contract for the installed HW option has been concluded or not".

When notified of the information about the subscription contract for the HW option 17 from the management device 30, the processor 12 updates the information of "whether a subscription contract for the installed HW option has been concluded or not" in the retained information, according to the content of this notification. Specifically, when notified of a permission report that the HW option 17 is available from the management device 30, the processor 12 rewrites the information of "whether a subscription contract for the installed HW option has been concluded or not" in the retained information to "YES" and records the subscription period. Meanwhile, when notified of a no-permission report that the HW option 17 is unavailable from the management device 30, the processor 12 rewrites the information of "whether a subscription contract for the installed HW option has been concluded or not" in the retained information to "NO" and records an invalid value as the subscription period.

(2) Installation Sequence for Uncontracted HW Option

An example of a sequence where the HW option 17 for which a subscription contract has not been concluded yet is newly installed in the printing device 10 and where a subscription contract is subsequently concluded, will now be specifically described with reference to FIG. 6. The user installs the HW option 17 in the attachment/detachment unit 16 of the printing device 10 (step S100) in the state where the power of the printing device 10 is off. The user then turns on the power of the printing device 10 (step S105). The processor 12 of the printing device 10 thus starts startup processing for when the power of the printing device 10 is turned on. In the course of this process, the processor 12 acquires the authentication information recorded in the non-volatile memory of the HW option 17 (step S110). In step S110, permission information representing permission of use is not recorded in the authentication information recorded in the non-volatile memory of the HW option 17. That is, the authentication information shown in FIG. 4 acquired by the processor 12 in step S110 includes the serial number of the HW option 17 and information representing "NO" as the information of "whether a subscription contract has been concluded or not". The user ID and the subscription period are invalid values.

After acquiring the authentication information from the HW option 17, the processor 12 of the printing device 10 updates the retained information, based on the authentication information (step S115). That is, the processor 12 records the serial number of the installed HW option in the retained information shown in FIG. 5. The processor 12 also records that the subscription contract for the HW option 17 having this serial number is "NO", and sets an invalid value for the subscription period, in the retained information.

Next, the processor 12 disables the function of the HW option 17 (step S120). When the subscription contract is "NO", the processor 12 makes the function using the HW option 17 unavailable until a permission report is sent from the management device 30. That is, when determining that the subscription contract for the HW option 17 is "NO", based on the authentication information acquired from the installed HW option 17, the processor 12 temporarily makes the function corresponding to the HW option 17 unavailable. For example, when the HW option 17 is a FAX board, a FAX transmission/reception function using a component installed at the FAX board is disabled.

Next, the processor 12 transmits the retained information shown in FIG. 5 of the printing device 10 to the management device 30 (step S125). That is, the processor 12 automatically logs in to the management device 30, using the user ID and the password included in the retained information. The processor 12 then transmits the serial number of the main body of the printing device 10, the serial number of the installed HW option 17, and the information representing that the subscription contract for the HW option 17 is "NO", included in the retained information, to the management device 30.

On receiving the retained information from the printing device 10, the control unit 32 of the management device 30 updates the content of the individual management table for the printing device and makes the HW option pending until a subscription contract is concluded (step S130). That is, in step S130, the control unit 32 of the management device 30 specifies the printing device 10 that is the processing target, based on the serial number, and records the serial number of the HW option 17 in association with the printing device having this serial number in the individual management table for the printing device shown in FIG. 2. In this embodiment, as the serial number of the printing device and the serial number of the HW option 17 are linked to each other, the user of this printing device can conclude a subscription contract for the HW option 17.

The user operates the terminal 20 to request the conclusion of a subscription contract for the HW option 17 (step S135). That is, after performing steps S100 and S105, the user operates the terminal 20 to log in to the management site provided by the management device 30, using the user ID and the password, and performs an operation of designating the serial number of the HW option 17 linked to the printing device 10 already registered in association with the user ID and requesting a subscription contract.

In response to the request to conclude a subscription contract for the HW option 17 in step S135, the control unit 32 of the management device 30 concludes a subscription contract for the HW option 17 and notifies the printing device 10 of a permission report (step S140). After concluding the subscription contract, the control unit 32 rewrites the information representing the subscription contract for the HW option having this serial number, to "YES", and records the user ID and the subscription period (expiration date) in association therewith, in the individual management table for the HW option shown in FIG. 3. The control unit 32 then notifies the printing device 10 of a permission report representing a permission to use the HW option 17 since the subscription contract has already been concluded. The permission report is sent from the management device 30 in response to the installation of the HW option 17 and is also sent in response to the fact that the user has concluded a contract for use of (subscription contract for) the HW option 17 at the management device 30.

After acquiring the permission report from the management device 30, the processor 12 of the printing device 10 updates the retained information and notifies the HW option 17 (step S145). That is, the processor 12 updates the information of "whether a subscription contract for the installed option has been concluded or not", of the retained information shown in FIG. 5, from "NO" to "YES". The processor 12 then sends information corresponding to the permission report, that is, notifies the HW option 17 of the subscription contract "YES", the user ID, and the subscription period.

In response to the notification from the printing device 10, the HW option 17 updates the authentication information (step S150). That is, of the authentication information shown in FIG. 4, the information of "whether a subscription contract has been concluded or not" is updated from "NO" to "YES" and the subscription period is recorded. The user ID of the HW option 17 is recorded as well. These pieces of information are equivalent to the permission information corresponding to the permission report.

On acquiring the information that the recording of the permission information in the HW option 17 is complete via the printing device 10, the control unit 32 of the management device 30 transmits display data of a reboot guide to the terminal 20 (step S155). As a result, a reboot guide for guiding a reboot of the printing device 10 is displayed on the display of the UI unit 23 of the terminal 20.

In response to the display of the reboot guide at the terminal 20, the user turns off the power of the printing device 10 and then turns on the power (step S160). As a result, the processor 12 of the printing device 10 starts startup processing for the printing device 10. In the course of this process, the processor 12 acquires the authentication information shown in FIG. 4 from the HW option 17 (step S165).

While the permission information is not recorded in the authentication information transmitted in step S110, the permission information is included in the authentication information transmitted in step S165.

On receiving the authentication information from the HW option 17, the processor 12 of the printing device updates the retained information, based on the authentication information (step S170). Here, the retained information is updated with the same content as the content updated in step S145. Step S170 may be omitted. A configuration to acknowledge that the authentication information acquired in step S165 does not contradict the content of the retained information (the authentication information and the retained information are successfully synchronized) and then proceed to step S175, may be employed.

Next, the processor 12 enables the option function (step S175). That is, the processor 12 makes the function using the HW option 17 available. For example, when the HW option 17 is a FAX board, the FAX transmission/reception function is made available. In this way, when the HW option 17 stores the permission information, the processor 12 makes the function using the HW option 17 available even when the permission report is not newly sent from the management device 30.

Next, the processor 12 transmits the retained information shown in FIG. 5 of the printing device 10 to the management device 30 (step S180). That is, the processor 12 automatically logs in to the management device 30, using the user ID and the password included in the retained information. The processor 12 then transmits the serial number of the main body of the printing device 10, the serial number of the installed HW option 17, the information representing that the subscription contract for the HW option 17 is "YES", and the subscription period, included in the retained information, to the management device 30. On receiving the retained information from the printing device 10, the control unit 32 of the management device 30 updates the content of the individual management table for the printing device (step S185). Here, the retained information is updated with the same content as the content updated in step S130. Step S185 may be omitted. Instead, processing to acknowledge that the information acquired in step S180 does not contradict the content updated in step S130 (information is successfully synchronized among the management device, the printing device, and the HW option) may be performed.

When the subscription request in step S135 is not made, the sequence from step S140 onward is not executed and the printing device 10 continues to be in the state where the function of the HW option 17 is unavailable.

(3) Contract Termination Sequence

Figure 7:
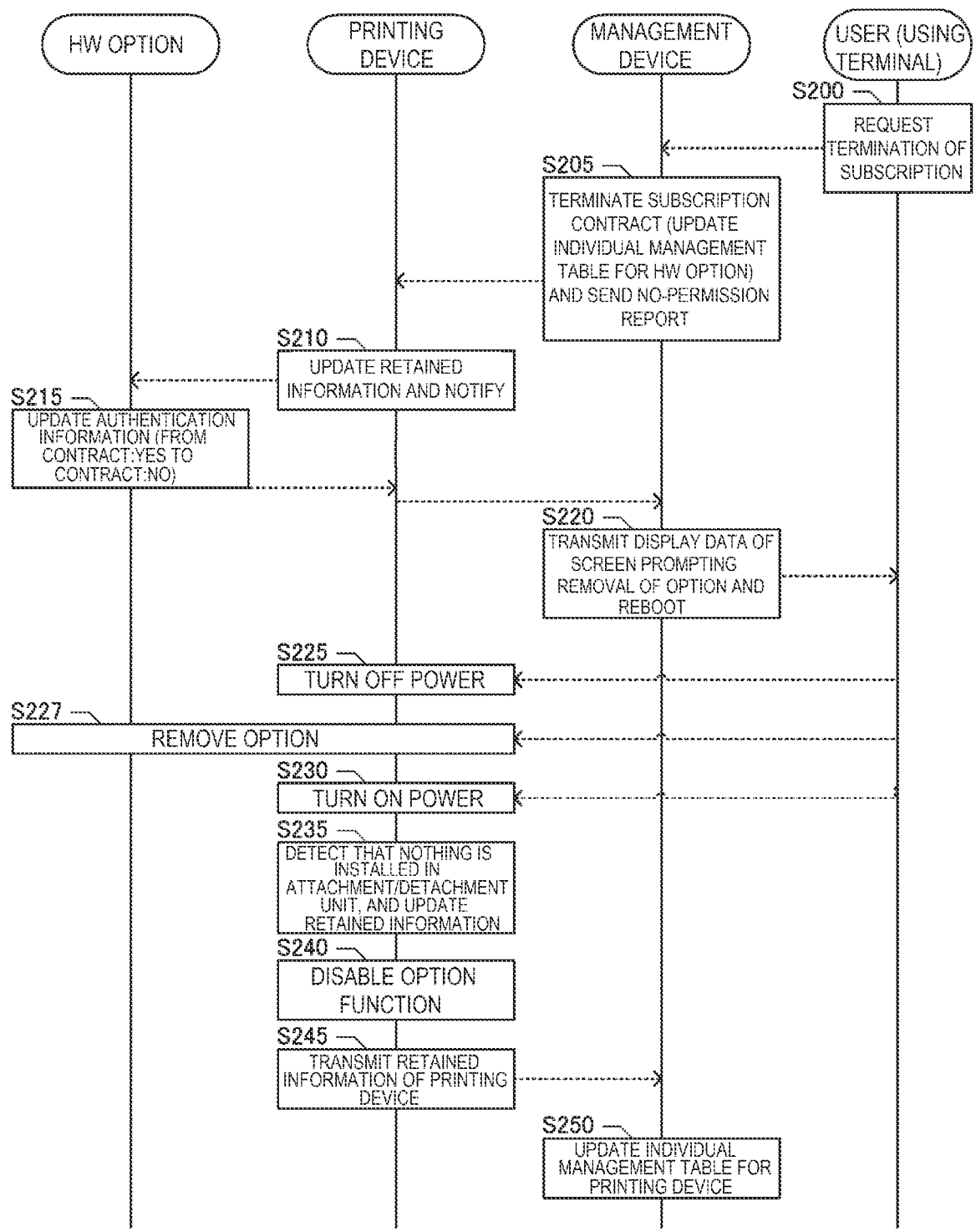
FIG. 7 is a sequence chart showing an example of a contract termination sequence.

An example of a subscription contract termination sequence will now be specifically described with reference to FIG. 7. The user operates the terminal 20 to log in to the management site disclosed by the management device 30, using the user ID and the password, and then designates the serial number of the HW option 17, and requests the termination of the subscription contract (step S200). In response to the termination request in step S200, the control unit 32 of the management device 30 terminates the subscription contract and notifies the printing device 10 of a no-permission report (step S205). That is, the control unit 32 of the management device 30 rewrites the information of the subscription contract for the HW option having this serial number to "NO" and records an invalid value for the subscription period (expiration date), in the individual management table for the HW option shown in FIG. 3. The user ID may be rewritten to an invalid value or may be held as it is. The control unit 32 then notifies the printing device 10 of a no-permission report representing no permission to use the HW option 17.

In response to the no-permission report from the management device 30, the processor 12 of the printing device 10 updates the retained information shown in FIG. 5 and notifies the HW option 17 (step S210). That is, the processor 12 updates the information of "whether a subscription contract for the installed HW option has been concluded or not", of the retained information shown in FIG. 5, from "YES" to "NO". The processor 12 also sets an invalid value for the "subscription period", of the retained information. The processor 12 then notifies the HW option 17 of information indicating that the subscription contract is "NO".

In response to the notification from the printing device 10, the HW option 17 updates the authentication information (step S215). That is, of the authentication information shown in FIG. 4, the information of "whether a subscription contract has been concluded or not" is updated from "YES" to "NO", and an invalid value is set for the subscription period. On acquiring the information that the update of the authentication information in the HW option 17 is complete via the printing device 10, the control unit 32 of the management device 30 transmits, to the terminal 20, display data of a guide prompting the user to remove the HW option 17 and reboot the printing device 10 (step S220). As a result, the guide prompting the user to reboot the printing device 10 is displayed on the display of the UI unit 23 of the terminal 20.

In response to the display of the guide at the terminal 20, the user turns off the power of the printing device 10 (step S225), removes the HW option 17 from the attachment/detachment unit 16 (step S227), and then turns on the power of the printing device 10 (step S230). As a result, the processor 12 of the printing device 10 starts startup processing for the printing device 10. In the course of the startup processing, when the processor 12 detects that no HW option 17 is installed in the attachment/detachment unit 16, the processor 12 updates the retained information shown in FIG. 5 (step S235). That is, the processor 12 sets an invalid value for the "serial number of the installed HW option" in the retained information shown in FIG. 5.

Next, the processor 12 disables the option function (step S240). That is, the function of the HW option 17 is disabled in response to the no-permission report from the management device 30. For example, when the HW option 17 is a FAX board, a FAX transmission/reception function using a component installed at the FAX board becomes unavailable. The processing in step S240 may be executed in step S210.

Next, the processor 12 transmits the retained information shown in FIG. 5 of the printing device 10 to the management device 30 (step S245). That is, the processor 12 automatically logs in to the management device 30, using the user ID and the password included in the retained information. The processor 12 then transmits the serial number of the main body of the printing device 10, the information representing that the HW option 17 is not installed (invalid value number), the information representing that the subscription contract for the HW option 17 is "NO", and the subscription period represented by an invalid value, included in the retained information, to the management device 30.

On receiving the retained information from the printing device 10, the control unit 32 of the management device 30 updates the content of the individual management table for the printing device (step S250). That is, in this case, the control unit 32 records an invalid value as the serial number of the HW option 17 installed in the printing device that is the processing target, in the individual management table for the printing device shown in FIG. 2.

(4) Installation Sequence for Contracted HW Option

Figure 8:
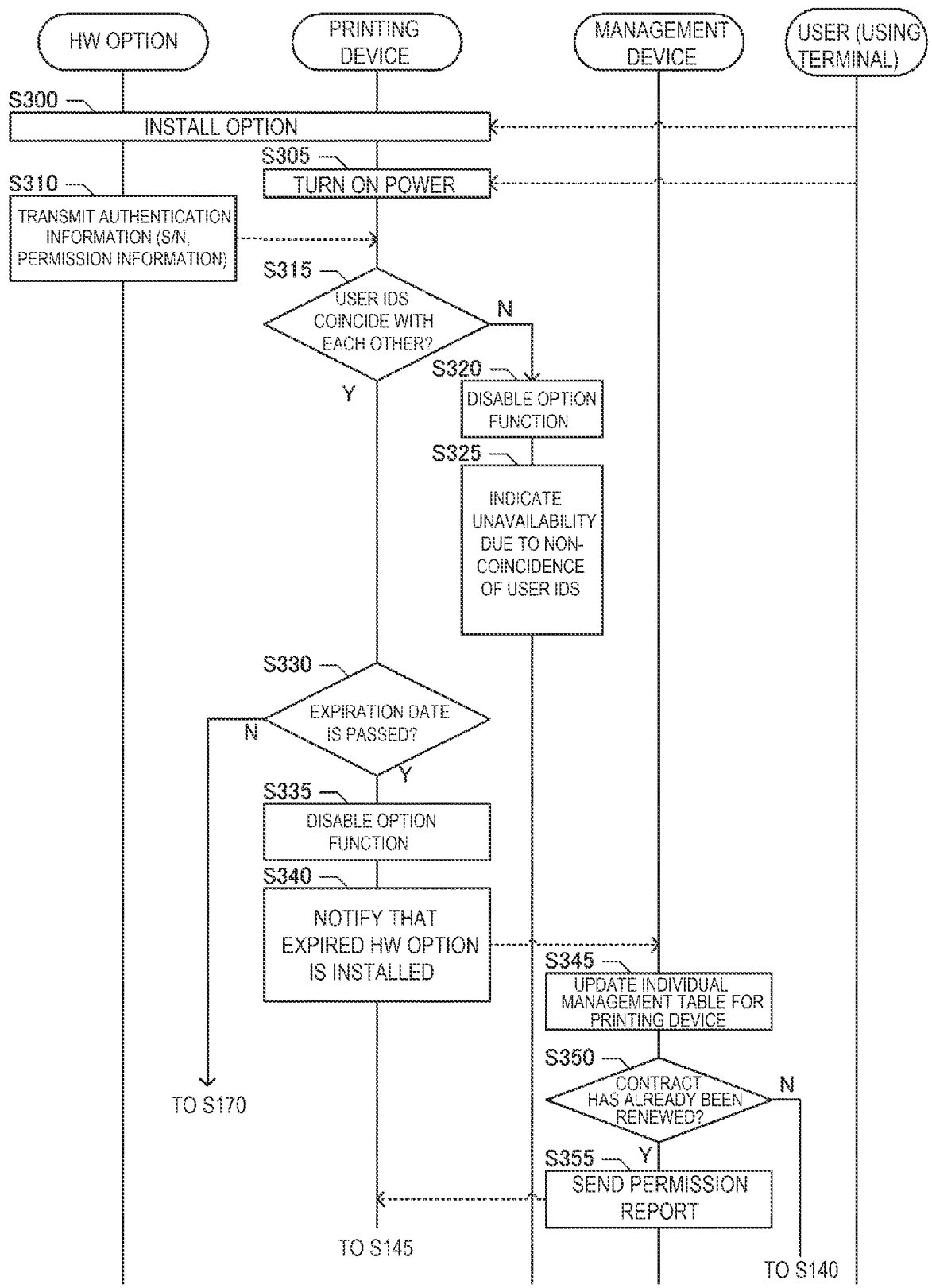
FIG. 8 is a sequence chart showing an example of an installation sequence for a contracted HW option.

An example of a sequence for installing the HW option 17 for which a subscription contract has already been concluded, in the printing device 10, will now be specifically described with reference to FIG. 8. In the HW option 17 for which a subscription contract has already been concluded, permission information is recorded in the authentication information shown in FIG. 4 by the execution of the foregoing sequence shown in FIG. 6. After the sequence shown in FIG. 6 is executed, the HW option 17 can be removed from the printing device 10 and installed and used in another printing device while the subscription contract remains valid. The sequence shown in FIG. 8 is a sequence for installing the HW option 17 in the state where the subscription contract "YES" is recorded as the authentication information (that is, in the state where permission information is recorded), in the printing device 10. In this embodiment, the sequence after the power is turned on differs according to the circumstance where the power is turned on. Therefore, the sequence shown in FIG. 8 differs from the sequence from step S160 onward shown in FIG. 6.

First, the user installs the HW option 17 in the attachment/detachment unit 16 of the printing device 10 in the state where the power of the printing device 10 is off (step S300), and then turns on the power of the printing device 10 (step S305). Thus, the processor 12 of the printing device 10 starts startup processing for when the power of the printing device 10 is turned on. In the course of this process, the processor 12 acquires the authentication information recorded in the non-volatile memory of the HW option 17 (step S310). In step S310, the authentication information shown in FIG. 4 recorded in the non-volatile memory of the HW option 17 includes the serial number of the HW option 17 and the permission information (subscription contract YES, user ID, and subscription period).

After acquiring the authentication information from the HW option 17, the processor 12 determines whether the permission information corresponds to the retained information or not. When the permission information corresponds to the retained information, the processor 12 makes the function using the HW option 17 available even without a permission report. When the permission information does not correspond to the retained information, the processor 12 makes the function using the HW option 17 unavailable until a permission report is acquired.

Specifically, when the user information included in the permission information and the user information included in the retained information coincide with each other, the processor 12 makes the function using the HW option available even without a permission report. When the two pieces of user information do not coincide with each other, the processor 12 makes the function using the HW option unavailable until a permission report is acquired. The processor 12 also compares the expiration date included in the permission information with the current time included in the retained information. When the expiration date has not passed, the processor 12 makes the function using the HW option available even without a permission report. When the expiration date is passed, the processor 12 makes the function using the HW option unavailable until a permission report is acquired.

More specifically, after the permission information is acquired in step S310, the processor 12 determines whether the user ID included in the permission information and the user ID stored as the retained information in the printing device 10 coincide with each other or not (step S315). When it is not determined in step S315 that the user IDs coincide with each other, the processor 12 disables the option function (step S320) and causes the UI unit 13 of the printing device 10 to display a guide indicating that the HW option is not available due to the non-coincidence of the user IDs (step S325). Therefore, when the user IDs do not coincide with each other, the function of the HW option 17 remains unavailable until a permission report is acquired. The user performs, for example, the procedure for the termination of the subscription contract shown in FIG. 7 with another printing device having a user ID that coincides with the user ID recorded in the HW option 17, and then executes the sequence shown in FIG. 6 with this printing device 10. Thus, the user can make the HW option 17 available at this printing device 10.

When it is determined in step S315 that the user IDs coincide with each other, the processor 12 determines whether the expiration date is passed or not (step S330). That is, the processor 12 compares the subscription period recorded in the HW option 17 with the current time and determines whether the subscription period has passed or not. When it is not determined in step S330 that the subscription period has passed, the processor 12 executes the sequence from step S170 onward shown in FIG. 6. That is, the processor 12 enables the option function and makes the function of the HW option 17 available. In this way, when the HW option 17 stores the permission information and the permission information corresponds to the retained information, the function using the HW option 17 can be made available even without a permission report from the management device 30. Therefore, the HW option 17 can be installed from one printing device to another printing device and shared among a plurality of printing devices owned by the same user, and there is no need to prepare the HW option 17 for each printing device. Also, when the main body of the printing device has a malfunction and needs to be replaced, the HW option 17 can be attached to and used in a new printing device 10.

When it is determined in step S330 that the expiration date is passed, the processor 12 disables the option function (step S335). Therefore, when the expiration date is passed, the function of the HW option remains unavailable until a permission report is acquired. Subsequently, the processor 12 notifies the management device 30 that the expired HW option 17 is installed (step S340). Specifically, the management device 30 is notified of the serial number of the HW option 17 and the subscription period recorded in the HW option 17. In response to this notification, the control unit 32 of the management device 30 updates the individual management table for the printing device (step S345). Specifically, the control unit 32 records the serial number of the installed HW option 17 in the individual management table for the printing device shown in FIG. 2. Next, the processor 12 determines whether the contract has already been renewed or not, referring to the subscription period corresponding to the HW option having this serial number in the individual management table for the HW option shown in FIG. 3 (step S350). That is, the processor 12 determines whether the subscription period has already been extended and the current time is within the extended subscription period, or not. When it is determined in step S350 that the contract has already been renewed, the control unit 32 of the management device 30 notifies the printing device 10 of a permission report (step S355). Specifically, the control unit 32 notifies the printing device 10 of the information representing the subscription contract "YES" and the renewed subscription period. On receiving the permission report, the processor 12 of the printing device 10 executes the sequence from step S145 onward shown in FIG. 6. When it is not determined in step S350 that the contract has already been renewed, the control unit 32 of the management device 30 waits for a contract renewal (subscription extension) request by the user. On receiving this request, the control unit 32 executes the sequence from step S140 onward shown in FIG. 6.

When it is not determined in step S350 in FIG. 8 that the contract has already been renewed, the management device 30 may notify the printing device 10 of a no-permission report and the processor 12 of the printing device 10 may cause the UI unit 13 of the printing device 10 to display a guide prompting the user to conclude (renew) the subscription contract. In this case, the no-permission report is acquired from the management device 30 in response to the notification indicating the installation of the HW option 17.

(5) Other Embodiments

The above embodiment is an example for implementing the present disclosure. Various other embodiments can be employed as well. For example, while, in the above embodiment, a printing device is employed as an example of the electronic device having the attachment/detachment unit which the HW option is attachable to and detachable from, the present disclosure is not limited to the printing device and can also be applied to various other electronic devices. The management device may be formed by a plurality of server computers or a single server computer.

In the above embodiment, the user uses another terminal than the printing device in order to browse the management site disclosed by the management device and conclude or terminate a subscription contract. However, the user may operate the UI unit of the printing device to perform a similar operation, instead of using another terminal than the printing device. Alternatively, the user may apply for the conclusion or termination of a subscription contract by telephone or by postal mail, and in response to this, an agent may register necessary information to the management device.

The contract for use of an option is a contract for installing and using the option in the electronic device. This contract may be a so-called subscription contract, lease contract or the like. The main body of the electronic device which the option is attachable to and detachable from may be fully purchased, or may be used based on a subscription contract, lease contract or the like. The terms of the contract are not limited to those in the above embodiment, either. The permission information may be any information corresponding to the terms of the concluded contract and is not limited to the permission information in the above embodiment.

The management unit may be configured to make the function using the option available when notified of a permission report from the management device or may be configured to make the function using the option unavailable when not notified of a permission report from the management device. The management unit may be configured to make the function using the option unavailable when notified of a no-permission report from the management device or may be configured to make the function using the option available when not notified of a no-permission report from the management device.

The management unit may make the function using the option available even without a permission report, when the permission information stored in the option and the retained information retained in the management unit correspond to each other. Whether the two pieces of information correspond to each other or not, may be determined by other methods than the comparison of the user information or the comparison of the expiration date described in the embodiment. For example, the management unit may be configured to make the function using the option available even without a permission report, when the version of firmware in the HW option is recorded in the permission information, the version of firmware in the main body of the printing device is recorded in the retained information, and the two versions correspond to each other. For example, when the two versions do not correspond to each other, a permission report may be not sent until at least one of the two pieces of firmware is updated so that the two versions correspond to each other. When comparing the user information, whether data other than the user IDs (for example, passwords) coincide with each other or not, may be determined.

The electronic device such as the printing device may have all the configurations of the management unit described in the above embodiment or other embodiments, or may have one of these configurations, or may have a combination of a plurality of configurations of these configurations. For example, in the above embodiment, when the permission information stored in the option and the retained information retained in the printing device do not correspond to each other, the function using the option is made unavailable until a permission report is acquired. However, in another embodiment, regardless of whether these pieces of information correspond to each other or not, the function using the option may be made available if the permission information is stored in the option.

Figure 9:
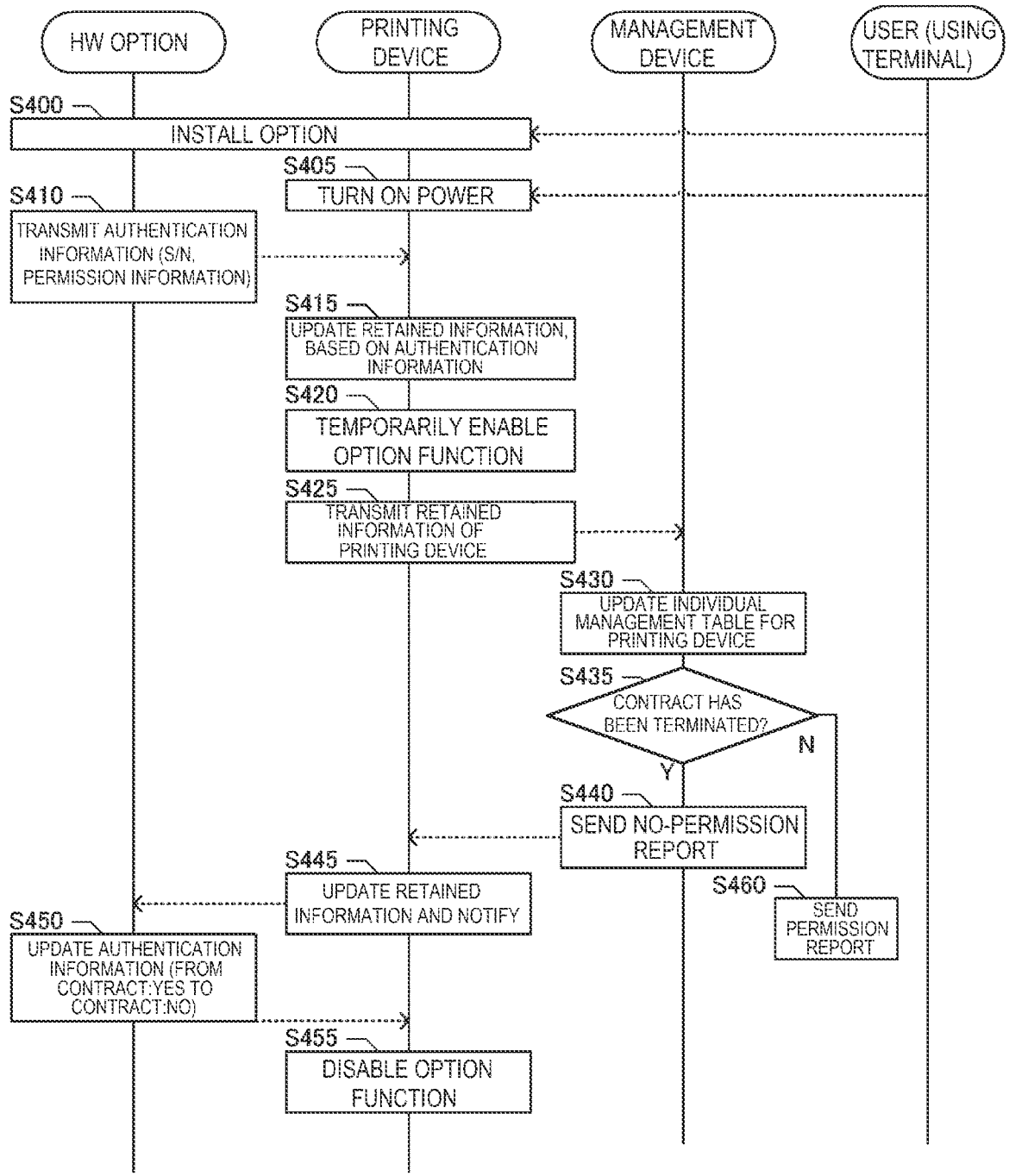
FIG. 9 is a sequence chart according to another embodiment.

FIG. 9 shows an example of a sequence according to another embodiment where the HW option 17 having permission information stored therein is installed. As shown in FIG. 9, when the option stores the permission information, the function using the option may be made available even without a permission report, and the function using the option may be made unavailable in response to a no-permission report from the management device. Specifically, the HW option 17 is installed (step S400) and the power is turned on (step S405). Thus, the processor 12 acquires the authentication information including the permission information from the HW option 17 (step S410). The processor 12 updates the retained information, based on the acquired authentication information (step S415) and temporarily enables the option function (step S420) because the permission information is recorded in the HW option 17. The processor 12 transmits the retained information to the management device 30 (step S425). The management device 30 updates the individual management table for the printing device (step S430), as in step S345 in FIG. 8. Next, the control unit 32 of the management device 30 determines whether the subscription contract for the HW option 17 has been terminated or not, referring to the individual management table for the HW option (step S435). When the subscription contract has been terminated, the control unit 32 notifies the printing device 10 of a no-permission report (step S440). In response to the no-permission report, the processor 12 of the printing device 10 updates the retained information and notifies the HW option 17 (step S445), as in step S210 in FIG. 7. On confirming that the HW option 17 has updated the authentication information (step S450) as in step S215 in FIG. 7, the processor 12 of the printing device 10 disables the option function (step S455). When it is not determined in step S435 that the contract has been terminated, the management device 30 may send a permission report (step S460). The permission report may include the latest information about the subscription contract (the subscription period or the like). In response to this permission report, the retained information of the printing device 10 and the permission information of the HW option 17 may be updated to the latest information.

Figure 10:
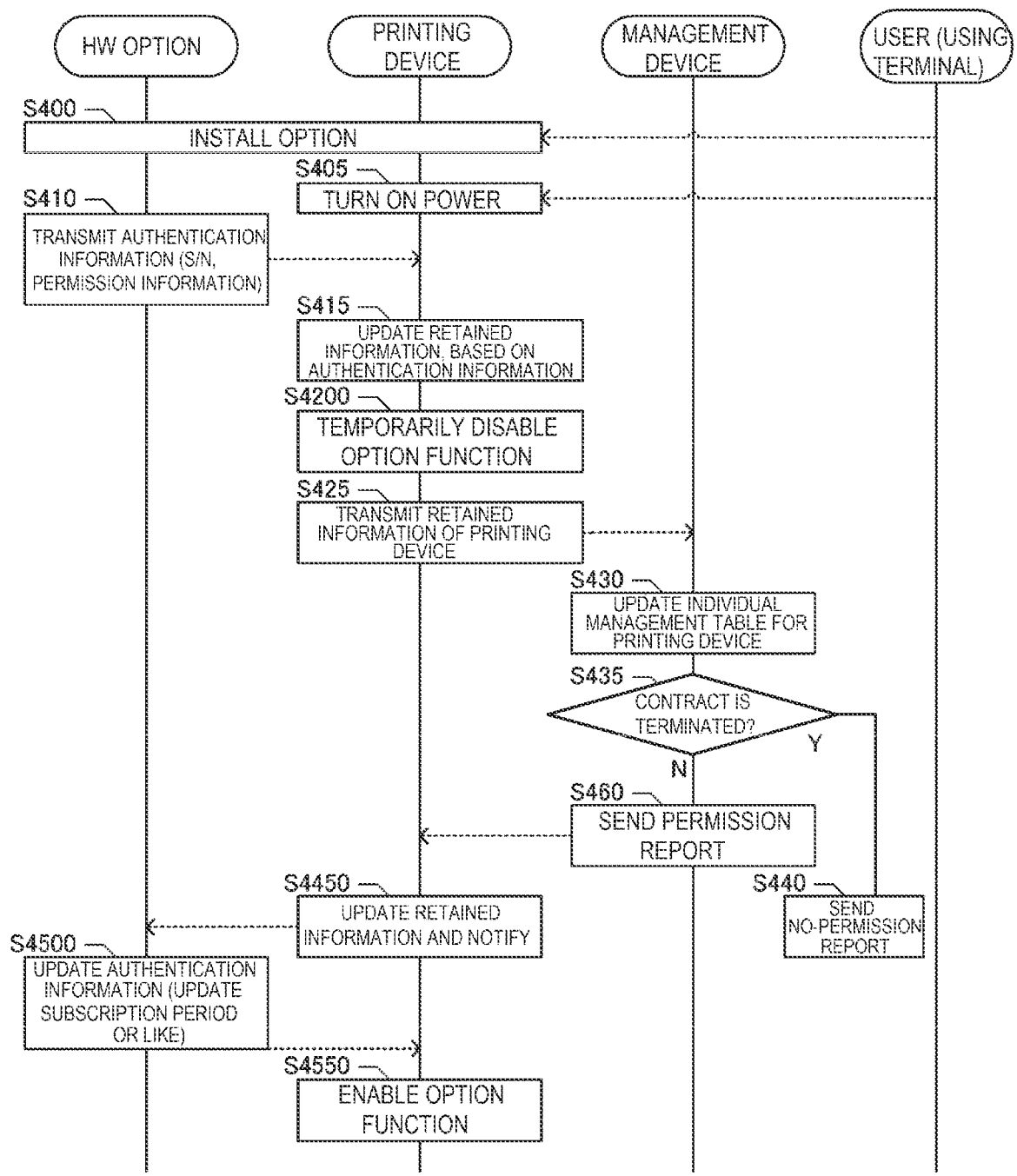
FIG. 10 is a sequence chart according to still another embodiment.

The permission report from the management device may be sent to the printing device 10 at other timings than when the user concludes the contract for use of the option. For example, even when the HW option 17 storing the permission information is installed, the option function may be temporarily disabled as shown in step S4200 in FIG. 10, and when a permission report is sent (step S460) as a result of the determination in step S435 by the management device 30, the option function may be enabled (step S4550). Specifically, in step S4200, the information about the subscription contract in the retained information is temporarily rewritten to "NO". In steps S4450 and S4500, the retained information and the permission information are updated, based on the latest information (for example, the extended subscription period or the like) included in the permission report.

In the above embodiment, the user is prompted to manually restart (reboot) the printing device. However, the printing device may be configured to automatically reboot itself without bothering the user. The data structures of various kinds of information shown in FIGS. 2 to 5 are examples and may be suitably changed.

The electronic device such as the printing device may be shared by a plurality of users. In such a case, a contract for use of the option may be concluded with each user, and the electronic device may identify a user trying to use the electronic device and may manage whether the option function is available or not, based on the contract for use concluded by the user trying to use the electronic device. For example, the permission report or the no-permission report from the management device includes information about permission or no-permission for each user, and the electronic device identifies the user trying to use the electronic device, based on who has logged in. The electronic device then allows the use of an option function permitted to the user who has logged in, and does not allow the use of an option function that is not permitted to the user who has logged in.

The present disclosure can also be applied as a program executed by a computer or as a method. The system, the program, and the method, as described above, may also be implemented as a single device or may be implemented using components provided in a plurality of devices, and therefore may include various aspects. Also, suitable changes such as a configuration that is partly software and partly hardware can be made. Moreover, the present disclosure may be implemented as a recording medium storing a program that controls the system. The recording medium storing the program may be a magnetic recording medium or a semiconductor memory. Any recording medium to be developed in the future may be similarly employed.

What is claimed is:

1. A printing device comprising:
a connector to which an optional hardware is configured to be attachably and detachably attached;
a processor configured to determine an attachment of the optional hardware to the connector; and
a communicator that is configured to communicate with a management device in response to determining the attachment of the optional hardware to the connector,
the processor being further configured to manage whether the optional hardware is available or not, in response to receiving a permission report that the optional hardware is available or a no-permission report that the optional hardware is unavailable, from the management device.

2. The printing device according to claim 1, wherein
the processor makes a function using the optional hardware unavailable until the permission report is provided from the management device.

3. The printing device according to claim 1, wherein
the processor acquires the permission report or the no-permission report from the management device in response to a notification representing the attachment of the optional hardware.

4. The printing device according to claim 1, wherein
the processor acquires the permission report in response to a user concluding a contract for use of the optional hardware at the management device.

5. The printing device according to claim 1, wherein
the processor causes the optional hardware to store permission information corresponding to the permission report in response to the permission report.

6. The printing device according to claim 5, wherein
the processor makes a function using the optional hardware available prior to receiving the permission report in response to a notification representing the attachment of the optional hardware and makes the function using the optional hardware unavailable after receiving the no-permission report in response to the notification representing the attachment of the optional hardware, when the optional hardware that has been attached stores the permission information.

7. The printing device according to claim 5, wherein
when the optional hardware stores the permission information and the permission information corresponds to retained information retained by the processor, the processor makes a function using the optional hardware available even without the permission report, and when the optional hardware stores the permission information and the permission information does not correspond to the retained information retained by the processor, the processor makes the function using the optional hardware unavailable until the permission report is acquired.

8. The printing device according to claim 7, wherein when user information included in the permission information and user information included in the retained information coincide with each other, the processor makes the function using the optional hardware available even without the permission report, and when these user information do not coincide with each other, the processor makes the function using the optional hardware unavailable until the permission report is acquired.

9. The printing device according to claim 7, wherein when an expiration date included in the permission information and current time included in the retained information are compared with each other and the expiration date is not passed, the processor makes the function using the optional hardware available even without the permission report, and when the expiration date is passed, the processor makes the function using the optional hardware unavailable until the permission report is acquired.

10. A management system comprising an electronic device and a management device, wherein
the electronic device including:
    a connector to which an optional hardware is configured to be attachably and detachably attached;
    a processor configured to determine an attachment of the optional hardware to the connector; and
    a communicator that is configured to communicate with the management device, in response to determining the attachment of the optional hardware to the connector
    the processor being further configured to manage whether the optional hardware is available or not, in response to receiving a permission report that the optional hardware is available or a no-permission report that the optional hardware is unavailable, from the management device,
the management device including:
    a transmitter transmitting the permission report or the no-permission report to the electronic device, based on a status of a contract for use of the optional hardware, when the management device is notified of the attachment of the optional hardware from the electronic device.

11. A management method for an electronic device to which an optional hardware is configured to be attachably and detachably attached, the management method comprising:
    determining an attachment of the optional hardware to the electronic device;
    causing the electronic device to communicate with a management device in response to determining the attachment of the optional hardware to the electronic device;
    causing the management device to report to the electronic device about whether the optional hardware is available or not, based on a status of a contract for use of the optional hardware; and
    causing the electronic device to manage whether the optional hardware that has been attached to the electronic device is available or not, according to the report from the management device.

* * * * *